(12) United States Patent
Sele et al.

(10) Patent No.: US 8,752,725 B2
(45) Date of Patent: Jun. 17, 2014

(54) CRUCIFORM PANELS

(75) Inventors: Arne Barrett Sele, Hosle (NO); Trygve Johannes Lund, Oslo (NO)

(73) Assignee: Aker Engineering & Technology AS, Lysaker (NO)

( * ) Notice: Subject to any disclaimer, the term of this patent is extended or adjusted under 35 U.S.C. 154(b) by 88 days.

(21) Appl. No.: 13/505,268

(22) PCT Filed: Oct. 28, 2010

(86) PCT No.: PCT/NO2010/000387
§ 371 (c)(1),
(2), (4) Date: Sep. 20, 2012

(87) PCT Pub. No.: WO2011/053155
PCT Pub. Date: May 5, 2011

(65) Prior Publication Data
US 2013/0130051 A1 May 23, 2013

(30) Foreign Application Priority Data

Oct. 29, 2009 (NO) .................................. 20093244
Jul. 2, 2010 (NO) .................................. 20100969

(51) Int. Cl.
*B65D 6/00* (2006.01)
*B65D 90/02* (2006.01)
*B65D 8/04* (2006.01)
*B65D 8/18* (2006.01)

(52) U.S. Cl.
USPC ...... 220/678; 220/560.04; 220/651; 220/653; 220/4.12; 428/594

(58) Field of Classification Search
USPC ......... 220/4.12, 560.04, 560.07, 560.08, 564, 220/651, 653, 654, 678, 901; 29/428; 428/594, 596, 598
See application file for complete search history.

(56) References Cited

U.S. PATENT DOCUMENTS

| 3,314,567 A | 4/1967 | Backer et al. |
| 5,651,474 A | 7/1997 | Callaghan et al. |
| 2008/0099489 A1* | 5/2008 | Ramoo et al. ................ 220/565 |
| 2010/0258571 A1 | 10/2010 | Ramoo et al. |

FOREIGN PATENT DOCUMENTS

| WO | WO0021847 | 4/2000 |
| WO | WO2005085099 | 9/2005 |
| WO | WO2006001709 | 1/2006 |
| WO | WO2006001711 | 1/2006 |

OTHER PUBLICATIONS

International Search Report for Int'l App. No. PCT/NO2010/000387—Date of Completion of Search: Jan. 5, 2011, 3 pages.
Norwegian Search Report for Norwegian App. No. 20100969—Date of Report:Sep. 23, 2010, 2 pages.

* cited by examiner

*Primary Examiner* — Fenn Mathew
*Assistant Examiner* — Madison L Poos
(74) *Attorney, Agent, or Firm* — Locke Lord LLP

(57) ABSTRACT

The present invention concerns a cruciform construction element for use inside a tank to connect panels, which element is forged or molded in one piece and comprises intersecting webs.

6 Claims, 4 Drawing Sheets

CRUCIFORM PANELS

FIELD OF INVENTION

The present invention relates to tanks for storage and transportation of fluids such as hydrocarbons, including low temperature liquefied natural gas. This includes tanks for ships and floating offshore structures exposed to wave loads as well as gravity based offshore structures and land tanks exposed to earthquakes.

BACKGROUND OF THE INVENTION

Tanks may be designed in many different configurations, such as spheres, cylinders, cones and shells in general, as well as prismatic shapes. The principal advantage of prismatic shapes is that they nest closer to each other, minimising the volume taken up by such tanks. Simple prismatic tanks are far less efficient structurally as they rely on bending action for mobilisation of strength. Shells develop strength through direct tension in the plane of the shell. This develops greater strength for the same amount of material.

A more efficient design of prismatic shapes is to incorporate internal stays (tension beams) and frames to absorb unbalanced loads. By developing stays as the main means of restraining the internal load or pressure augmented by web frames to absorb un-symmetric load components such as due to acceleration of the tank contents, such prismatic stayed tanks are comparable to shell shapes in structural efficiency. WO 2006/001711 A2 discloses such tanks and is hereby incorporated by reference.

Apart from developing structural strength the stays and the web frames dampen sloshing induced by wave motion. The horizontal loads on the tension stays and web frames due to sloshing are absorbed by the beams and the webs.

Certain metal structures have welded connections which develop lower strength than the base metal. This in particular applies to certain alloys which also are suitable for cryogenic applications. Web frames or walls sustaining loads applied out of their central plane sustain peak bending at supports in the form of intersecting frames or walls. A more effective design is to make the welded connections away from the support and as close as possible to points of inflection where stress is lower. Placing such low strength welds away from areas of high stress is also desirable for reasons of safety. Such low strength welds may cause very local yielding causing premature rupture with little deformation in the event of excessive thermal stress or other accidental load. This is particularly critical in the case cryogenic and combustible cargoes.

OBJECT OF THE INVENTION

The object of the present invention is to obtain a connection between orthogonally intersecting panels by an assembly developing the full strength at and in the vicinity of the intersection between web frames.

SUMMARY OF THE INVENTION

The object of the present invention is obtained by die forging cruciform metal elements and welding them together in a vertical stack to create a cruciform panel. Such cruciform forgings may be simple plates or may incorporate stiffeners of varying cross section. The following is comprised by the present invention:

A cruciform construction element for use inside a tank to connect web frames or walls, which element is forged or moulded in one piece and comprises intersecting vertical webs.

The cruciform element may further comprise stiffeners. The stiffeners may comprise horizontal plates.

An assembly of cruciform construction elements according to the invention, wherein said elements are stacked on top of each other and connected through their intersecting vertical webs.

The complete assembly have no transverse welds, only horizontal welds, joining the vertical stack together.

In a preferred embodiment, the horizontal welds of the assembly do not extend throughout the length of the horizontal edge of the vertical webs, but are partly replaced by an aperture.

In said assembly, a plate extension may be inserted, by welding, between the vertical webs.

Also comprised by the present invention is the use of at least one assembly, as described above, in the connection of multiple web frames, walls and/or panels at their intersections.

In the present invention, the term panel is considered to comprise the terms web frame, wall and plate, and may be made up of beam extrusions.

BRIEF DESCRIPTION OF THE DRAWINGS

Further details of the invention will be described below with reference to the exemplifying embodiments shown schematically in the appended drawings, wherein.

DETAILED DESCRIPTION OF THE DRAWINGS

Figure 1:
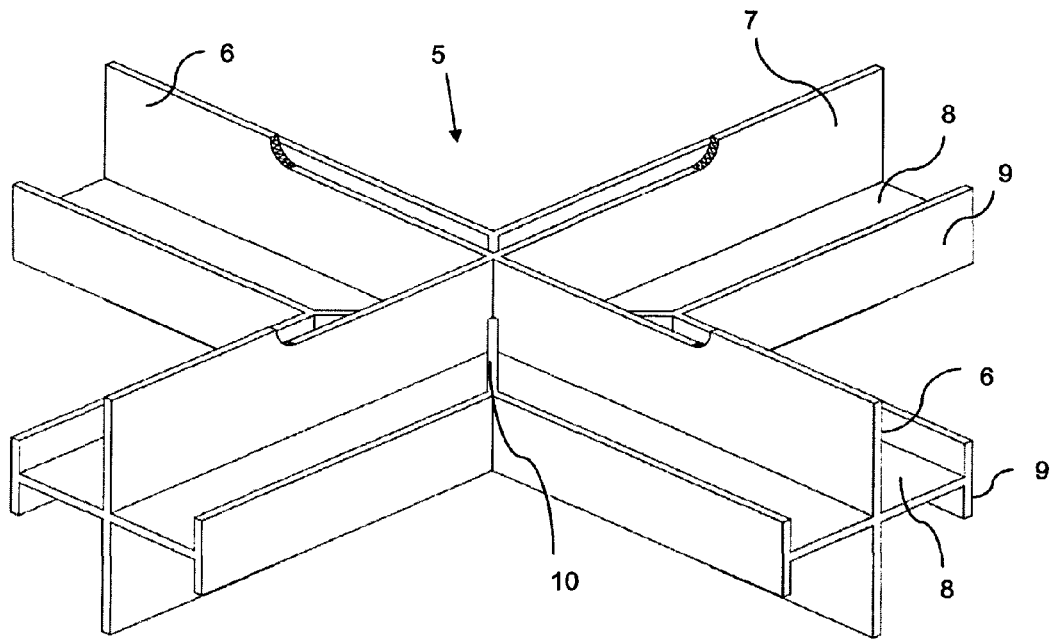
FIG. 1 shows a perspective view of a forged cruciform element.
Figure 2:
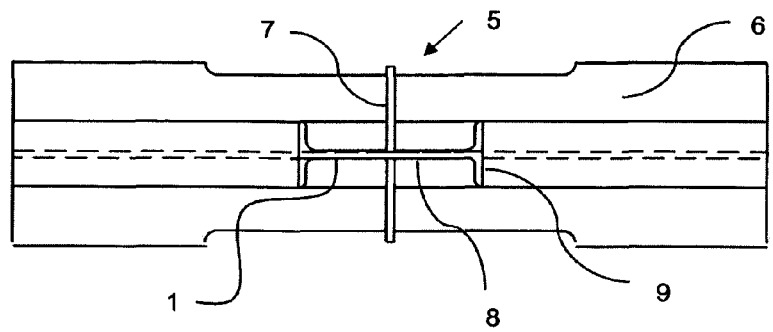
FIG. 2 shows a cross section through a forged cruciform element.

FIG. 1 shows a perspective view of a forged cruciform element 5 comprising crossing vertical webs 6 and 7, and FIG. 2 shows a cross section of same 5. These figures illustrate stiffeners 1 which comprise horizontal plates 8 having vertical ribs 9 along their outer edges. Where the ribs 9 meet at their inner ends, they continue at an angle as an extension rib 10 to the centre of the element 5. In other embodiments, the stiffeners may be of different shape, and the ribs 9 may even be omitted.

Figure 3:
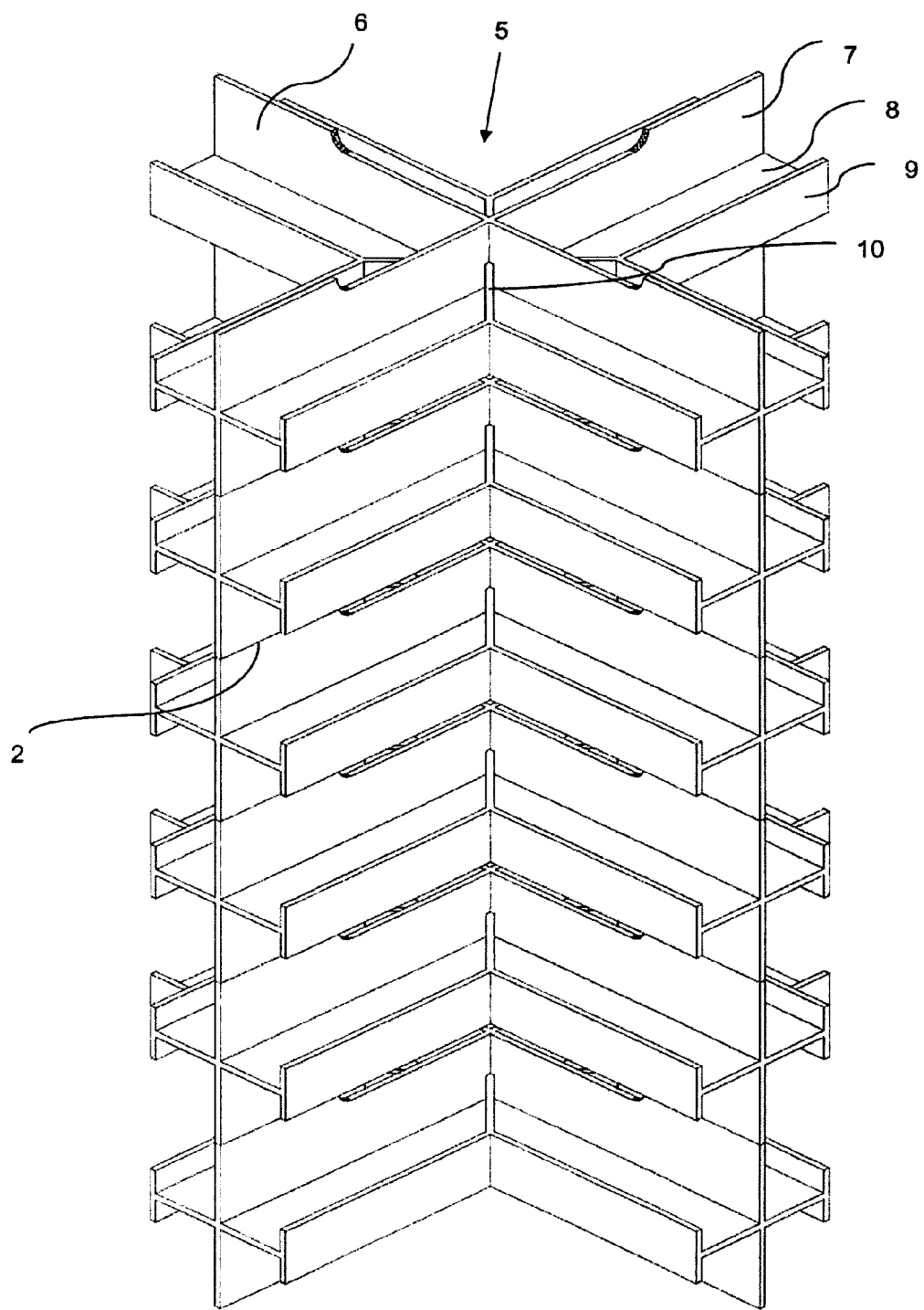
FIG. 3 shows a perspective view of the welded assembly of cruciform forgings.

FIG. 3 shows a perspective of an assembly of such cruciform elements 5 joined together by horizontal weld seams 2. The assembly may also incorporate apertures 3 as illustrated. In addition, plate extensions may be added where the weld 2 is shown.

Figure 4:
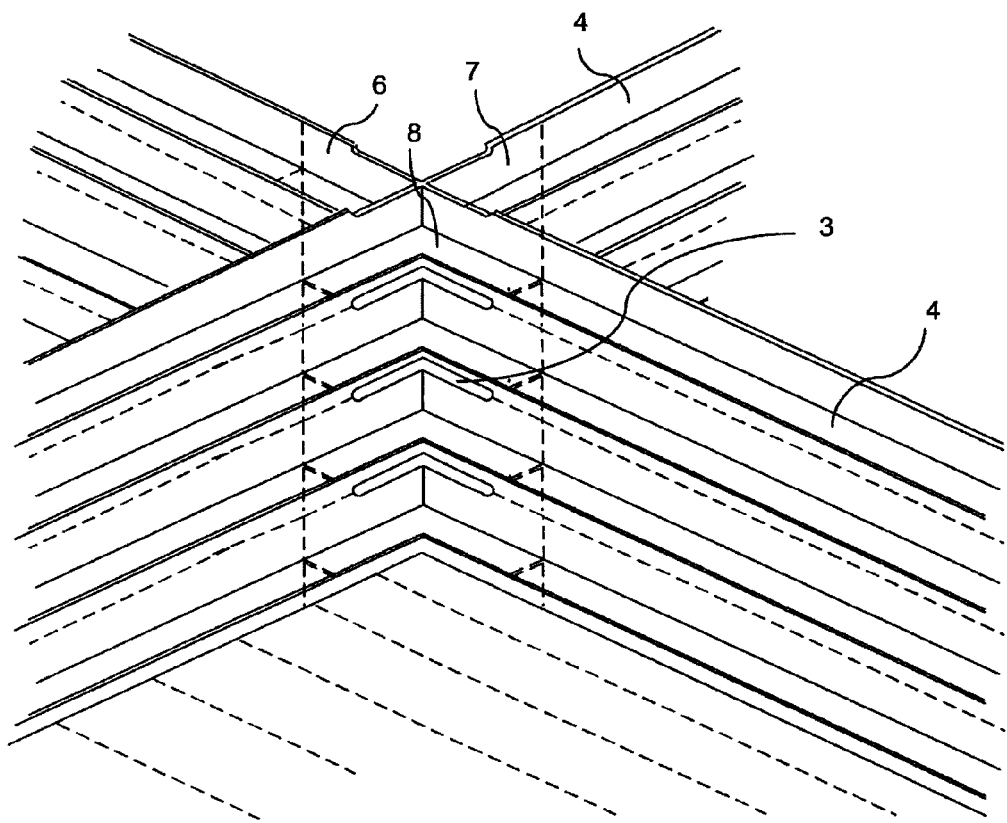
FIG. 4 shows a perspective view of s structure incorporating an assembly of cruciform forgings.

FIG. 4 shows a perspective view of such an assembly of cruciform forgings 5. In this case the stiffeners are simple plates 8. The assembly of cruciform forgings is connected to two intersecting panels, web frames or walls, made up of beam extrusions 4, and supported on the bottom of a tank.

Figure 5:
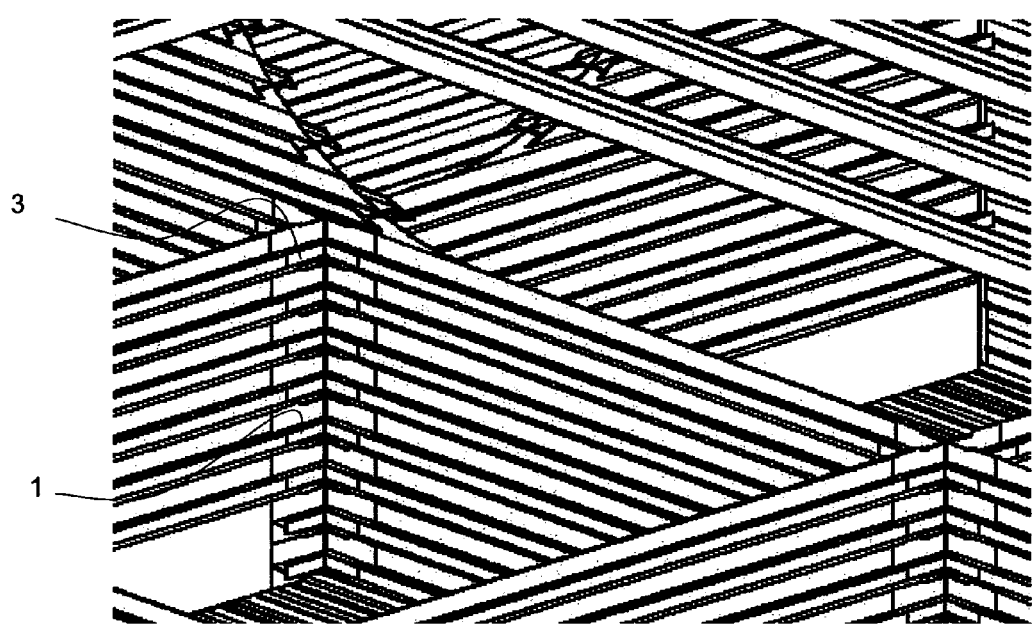
FIG. 5 shows a perspective view of the interior of a tank with web frames or walls.

FIG. 5 shows a perspective view of the interior of a tank with panels made up of beam extrusions, where these are connected at the intersection with cruciform panels.

The invention claimed is:

1. An assembly of cruciform construction elements to connect panels for use inside a tank, wherein said elements are forged or moulded in one piece and comprise intersecting vertical webs, wherein said elements are stacked on top of each other and are connected through their intersecting vertical webs.

2. An assembly of cruciform elements according to claim 1, wherein said elements further comprise stiffeners.

3. An assembly of cruciform elements according to claim 2, wherein the stiffeners comprise horizontal plates.

4. An assembly according to claim 1, wherein a complete assembly comprises horizontal welds joining a vertical stack together, but comprises no transverse welds.

5. An assembly according to claim 1, wherein an aperture partly extends through a length of a horizontal edge of the vertical webs.

6. A method of connecting multiple panels by connecting the panels at their intersections with at least one assembly according to claim 1.

* * * * *